(12) United States Patent
Baker et al.

(10) Patent No.: US 7,680,633 B2
(45) Date of Patent: Mar. 16, 2010

(54) AUTOMATED PROCESS FOR GENERATING A COMPUTED DESIGN OF A COMPOSITE CAMERA COMPRISING MULTIPLE DIGITAL IMAGING DEVICES

(75) Inventors: Henry Harlyn Baker, Los Altos, CA (US); Ian N. Robinson, Pebble Beach, CA (US); Donald O. Tanguay, Jr., Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 873 days.

(21) Appl. No.: 11/410,618

(22) Filed: Apr. 25, 2006

(65) Prior Publication Data

US 2007/0248350 A1  Oct. 25, 2007

(51) Int. Cl.
*G06F 17/50* (2006.01)
*G03B 41/00* (2006.01)
(52) U.S. Cl. .......................... 703/1; 396/322; 396/325
(58) Field of Classification Search ................ 703/1, 703/2; 348/36, 37, 38, 47, 48, 584; 382/284, 382/294; 396/322, 20, 21, 325; 700/98
See application file for complete search history.

(56) References Cited

U.S. PATENT DOCUMENTS

| 6,778,207 | B1 | 8/2004 | Lee et al. | |
| 6,962,289 | B2 * | 11/2005 | Vatan et al. | 235/462.01 |
| 2004/0061774 | A1 | 4/2004 | Wachtel et al. | |
| 2008/0156882 | A1 * | 7/2008 | Tsikos et al. | 235/462.43 |

OTHER PUBLICATIONS

Sun Microsystems (View Model Details, 2001).*

Tanguay et al., "Achieving High Res. Video Using Scalable Capture, Processing, and Display," VISAPP: Inter. Conf. on Comp. Vision Theory and Apps., Feb. 25-28, 2006, Portugal.

Baker et al., "Graphics-Accelerated Panoramic Mosaicking from a Video Camera Array," Stanford, U.S.A., Nov. 16-18, 2004.

Baker et al., "Multi-Viewpoint Uncompressed Capture and Mosaicking with a High-Bandwidth PC Camera Array," IEEE, 6th Workshop, Beijing, China, Oct. 2005.

Baker et al., "The Argus Eye," IEEE Robotics and Automation Magazine, 11:4, 2004.

Wilburn et al., "The Light Field Video Camera," Proc. Media Processors, SPIE Electronic Imaging, 4674, 2002.

(Continued)

*Primary Examiner*—Paul L Rodriguez
*Assistant Examiner*—Andre Pierre Louis

(57) ABSTRACT

A computed design of a composite camera having multiple digital imaging devices is generated automatically in accordance with the following process. A target volume to be captured by the composite camera and a target resolution for capturing the target volume are obtained. A representation of a view frustum of each of a plurality of digital imaging devices is generated based on at least one characteristic of each device. The digital imaging devices are organized based on the view frusta. A set of digital imaging devices is selected from the organized digital imaging devices, where the view frusta of the set of digital imaging devices substantially covers the target volume with at least the target resolution. The set of digital imaging devices are positioned based on each device's physical characteristics. A computed design of the composite camera that includes digital imaging devices held in position by a mechanical fixture is generated.

20 Claims, 14 Drawing Sheets

OTHER PUBLICATIONS

Erdem, M U etal—"Optimal Placement of Cameras in Floorplans to Satisfy Task Requirements and Cost Constraints"—Internet Citation—May 2004.

Bodor, R etal—"Multi-camera positioning to optimize task observability"-Proc IEEE Conference on Advanced Video and Signal Based Surveillance—Sep. 15, 2005—pp. 552-557.

Chen X etal—"Camera placement considering occlusion for robust motion capture"—Stanford Computer Science Technical Report—Jul. 2000.

Williams, Jeff etal—"Interactive Virtual Stimulation for Multiple Camera Placement"—IEEE International Workshop on Haptic Audio Visual Environments and Their Applications—Nov. 4, 2006—pp. 124-129.

Bardon C etal—"A Framework for Optimal Multi-Agent Sensor Planning"—International Journal of Robotics and Automation—vol. 19 No. 3 Jan. 1, 2004—pp. 152156.

Olague G et al—"Optimal camera placement for accurate reconstruction"—Pattern Recognition vol. 35 No. 4—Apr. 1, 2002—pp. 927-944.

Tarabanis K A et al—"A Survey of Esenor Planning in Computer Vision"—IEEE Transactions on Robotics and Automation—vol. 11 No. 1—Feb. 2, 1995—pp. 86-104.

"Java 3D API Specification," Chapter 9, Version 13, Sun Microsystems. Jun. 2002.

* cited by examiner

A) REJECT (Operational Range Does Not Cover Volume Behind Nearest Point)

B) ACCEPT But With Restricted Frustrum

C) ACCEPT

AUTOMATED PROCESS FOR GENERATING A COMPUTED DESIGN OF A COMPOSITE CAMERA COMPRISING MULTIPLE DIGITAL IMAGING DEVICES

BACKGROUND

A composite camera is generally capable of capturing images or videos by integrating images captured by multiple digital imaging devices. A digital imaging device includes at least an imager and a lens. The imager typically includes electronic components for converting images captured through the lens into digital images. Different sizes and types of imagers and lenses may be purchased from different manufacturers and need not be described in more detail herein.

Composite cameras are generally rare, and exist primarily in research environments. Their purpose is to provide, through multiplicity, capabilities difficult or impossible to attain in a single optical camera, for example extreme wide angled capture or varied resolution over the field of view. They are built through a process that typically requires intensive manual modeling (i.e., manual assembly and adjustments of each digital imaging device). The configuration of a manually assembled composite camera is a function of the desired characteristics (e.g., focal length, imager shape, intended coverage pattern, etc.) of its digital imaging devices. Composite cameras are generally time-consuming to produce, designed and built individually, and virtually un-reproducible.

Thus, there is growing demand for an automated process to design and construct composite cameras comprising multiple digital imaging devices arranged and configured to meet specific requirements.

SUMMARY

An exemplary method for automatically generating a computed design of a composite camera having multiple digital imaging devices comprises obtaining a target volume to be captured by the composite camera, obtaining a target resolution for capturing the target volume, generating a representation of a view frustum of each of a plurality of digital imaging devices based on at least one characteristic of each device, organizing the plurality of digital imaging devices based on the view frusta, selecting a set of digital imaging devices from the organized digital imaging devices based on at least one characteristic of each selected device, the view frusta of the set of digital imaging devices substantially covering the target volume with at least the target resolution, positioning the set of digital imaging devices based on each device's physical characteristics, and generating a computed design of the composite camera comprising the positioned digital imaging devices.

Other embodiments and implementations are also described below.

DETAILED DESCRIPTION

I. Overview

Exemplary processes for automatically generating a computed design of a composite camera comprising multiple digital imaging devices are described.

Section II describes an exemplary process for automatically generating a computed design of a composite camera comprising multiple digital imaging devices.

Section III describes an exemplary process for organizing a plurality of digital imaging devices.

Section IV describes an exemplary process for selecting digital imaging devices to cover a target volume.

Section V describes an exemplary process for optimizing selection and placement of the digital imaging devices in a computed design.

Section VI describes an exemplary process for generating a mechanical mounting fixture for retaining the digital imaging devices based on the computed design.

Section VI describes an exemplary computing environment.

Figure 1:
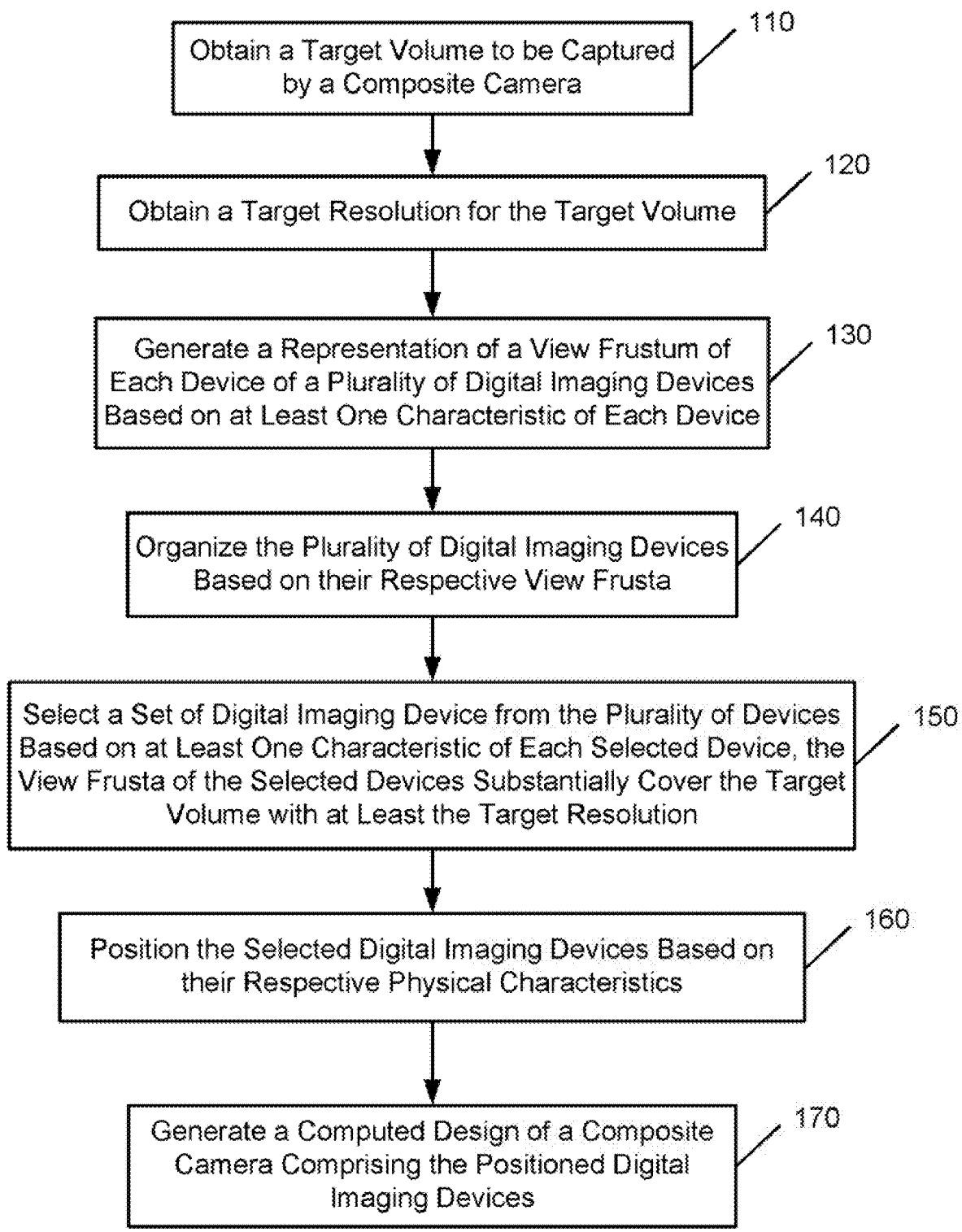
FIG. 1 illustrates an exemplary process for automatically generating a computed design of a composite camera comprising multiple digital imaging devices.

II. An Exemplary Process for Automatically Generating a Computed Design of a Composite Camera Comprising Multiple Digital Imaging Devices FIG. 1 illustrates an exemplary process for automatically generating a computed design of a composite camera comprising multiple digital imaging devices. In an exemplary embodiment, this exemplary process is implemented in a computer-aided design (CAD) program operating on a computing device. The CAD program in well known in the art and need not be described in more detail herein. Other computer design software may be used (alternatively or in combination) in accordance with the processes described herein. An exemplary computing environment will be described in more detail below with reference to FIG. 12.

At step 110, a target volume to be captured by a composite camera is obtained. In an exemplary implementation, the target volume is determined based on the dimensions of the object or objects to be captured by the camera. For example, the target volume could be the length and width of a table-top with a thickness corresponding to the uncertainty in the distance from the camera, or the volume of space in which a group of meeting participants's heads could appear. In one implementation, a model of the target volume may be generated within the CAD program using model generation techniques known in the art. In another exemplary implementation, the target volume may be a predetermined and/or a default volume.

The term "target volume" is merely an exemplary term for describing the intended operation area for a composite camera. The area may be alternatively referred to as "a three-dimensional configuration of sub-volumes or surfaces," "a configuration," and/or other suitable terms. Such a configuration may have components having different resolution requirements. A person skilled in the art will recognize that the target volume (or referred to by any other term) may be defined by a computer-aided design system that models an intended operation area with a combination of geometric primitives.

At step 120, a target resolution to capture the target volume is obtained. The target resolution is generally the minimum acceptable resolution for capturing the target volume. The target resolution may be expressed in pixels per square inch (ppi). For example, a target resolution may be specified to be 100 ppi.

At step 130, a computer representation of a view frustum of each digital imaging device of a plurality of digital imaging devices is generated based on at least one characteristic of each device. A view frustum is a three-dimensional object representing the imaging capabilities of a given digital imaging device. In general, each digital imaging device includes at least an imager and a lens. Characteristics of each digital imaging device include size of the imager, size of the lens, lens shape, type of lens (e.g., liquid or non-liquid), error tolerance, fields of view, focal lengths, f-number, and/or other characteristics. Imagers may be purchased in different sizes and resolutions. In an exemplary implementation, a designer of a composite camera may select one imager with a fixed size (or a family of imagers) for each camera to be built. In this implementation, the selected imager may be paired with a variety of lenses having different fields of view and/or focal lengths.

Figure 2:
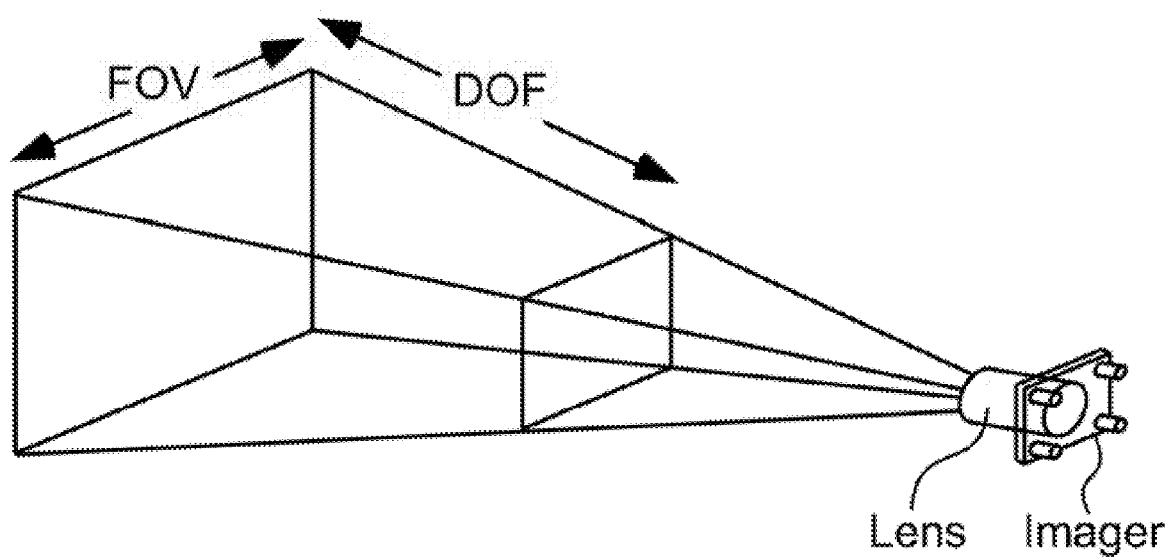
FIG. 2 illustrates an exemplary view frustum of an exemplary digital imaging device.
Figure 3:
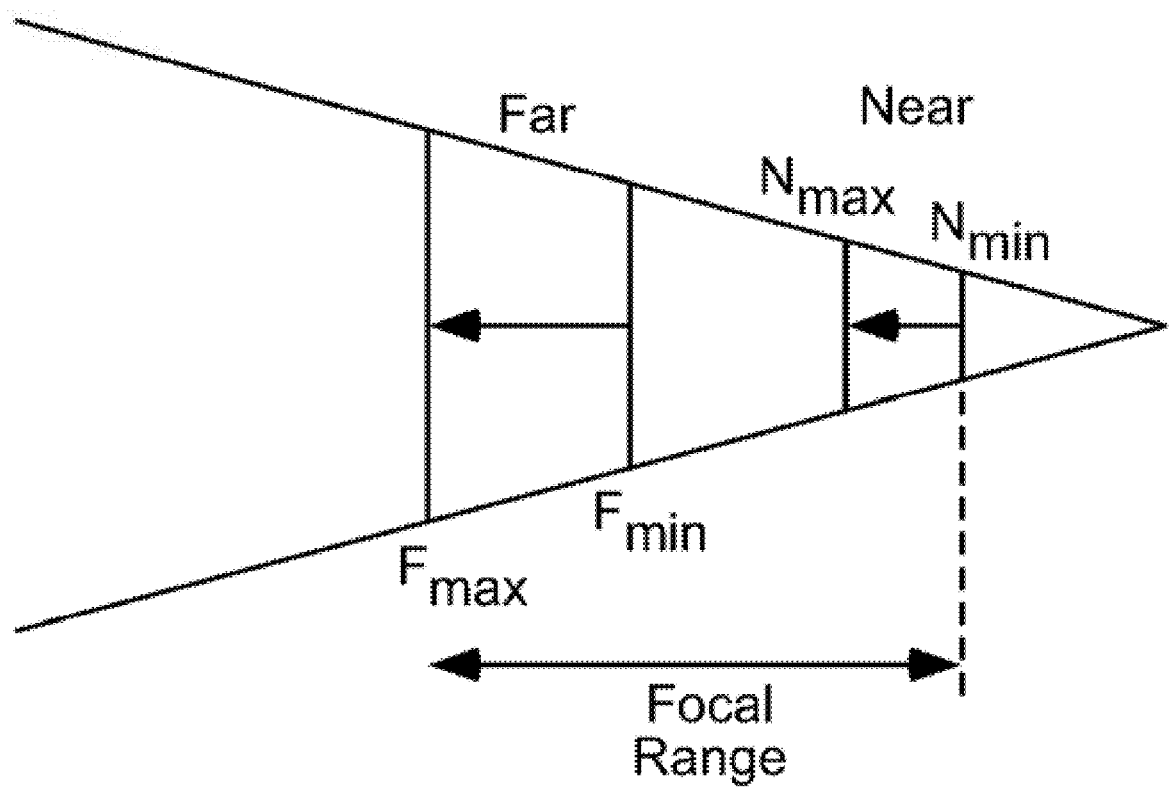
FIG. 3 illustrates an exemplary operational range of a digital imaging device having an adjustable focal length.

FIG. 2 illustrates an exemplary view frustum of an exemplary digital imaging device set at a particular focal length. The width of the view frustum is determined based on the field of view of the device and the focal range of the view frustum is determined based on the depth of field of the device. The focal range of a device may be adjusted if the focal length of the device is adjustable. Objects to be captured will be in focus if it is located within the focal range of the digital imaging device. FIG. 3 illustrates an exemplary focal range of a device having an adjustable focal length. The minimum focal plane nearest to the device is represented by Nmin, the maximum focal plane nearest to the device is represented by Nmax, the minimum focal plane farthest from the device is represented by Fmin and the maximum focal plane farthest from the device is represented by Fmax. The focal range for this particular device is the focal distance between Nmin and Fmax.

Figure 4:
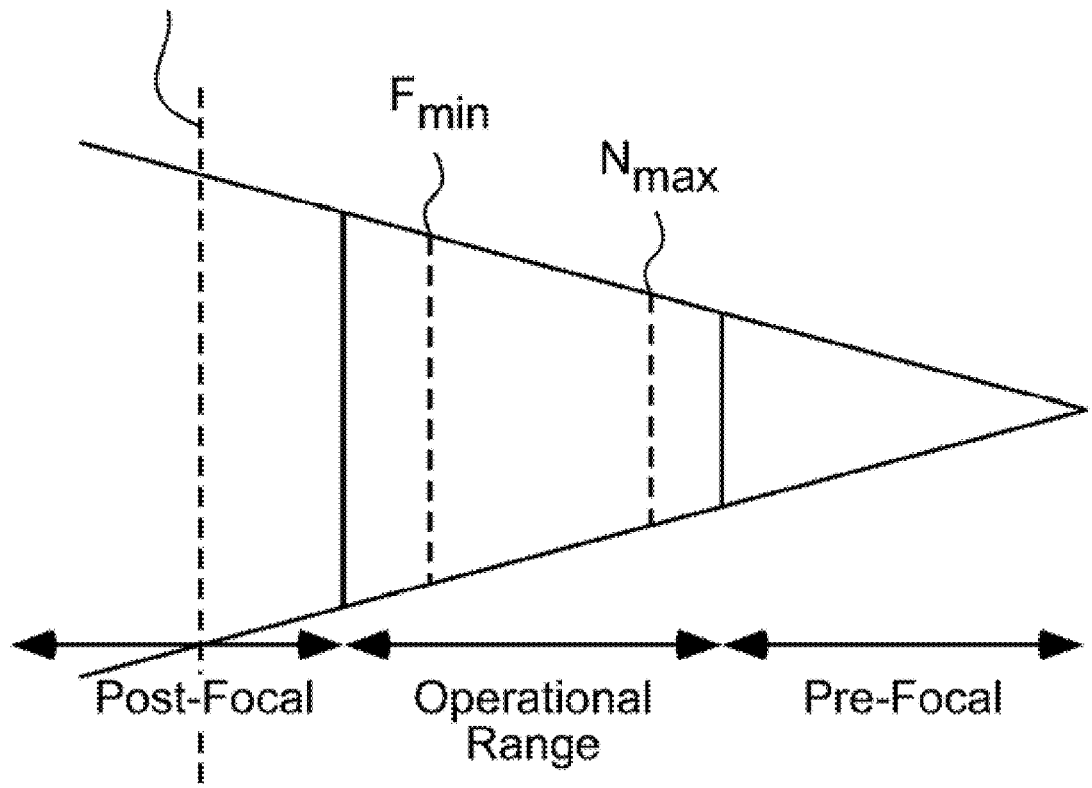
FIG. 4 illustrates an exemplary operational range, pre-focal range, and a post-focal range of a view frustum of an exemplary digital imaging device.

FIG. 4 illustrates an exemplary two-dimensional representation of a view frustum having an "operational range". The operational range is that part of the focal range that also meets the target resolution requirements of step 120. In general, the target resolution corresponds to a plane through the view frustum. That is, any object imaged at or nearer (to the device) than that plane will be imaged at or better than the target resolution. This plane may be beyond the focal range (in which case the operational range equals the focal range) (as shown in FIG. 4), within the focal range (in which case the operational range is shorter than the focal range), or before the focal range (in which case the imaging device is not suitable). The space between the device (not shown) and the beginning of the focal range can be referred to as the pre-focal range. The space between the end of the focal range or operational range (whichever is nearer) out to infinity may be referred to as the post-focal range.

Figure 5:
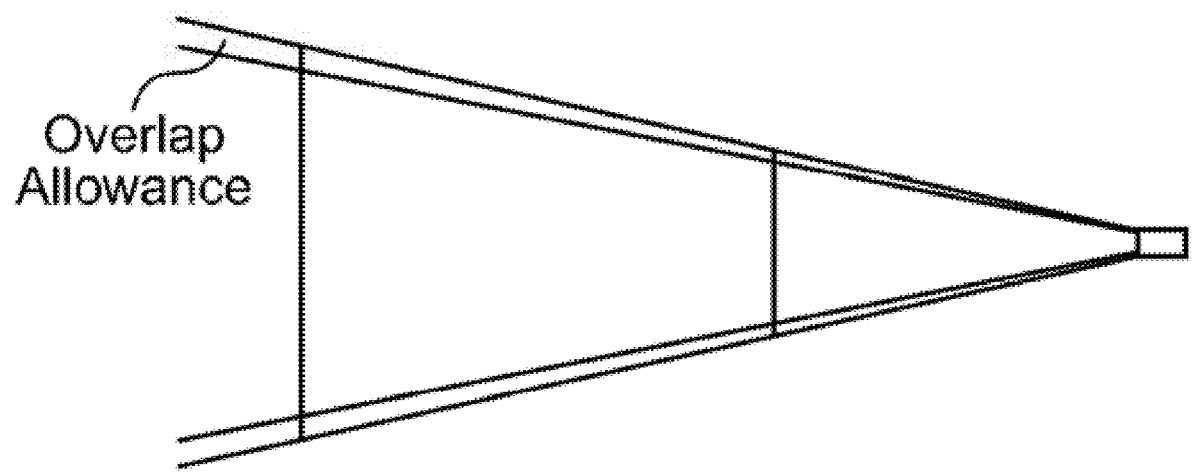
FIG. 5 illustrates an exemplary overlap allowance superimposed on an exemplary view frustum.

Due to manufacturing inconsistencies and/or other factors, each device typically has a manufacturer- or convention-specified error tolerance associated with it. The error tolerance may be considered when generating the view frustum for that device to ensure proper overlap among view frusta in subsequent steps to be described below. FIG. 5 illustrates a two-dimensional view of a view frustum having an overlap allowance to account for an error tolerance for a device. This overlap allowance may also be used to incorporate any recommended overlaps between images for later image processing software to seamlessly stitch the individual views together into one composite view Referring back to FIG. 1, at step 140, the plurality of digital imaging devices is organized based on the view frustum of each device. For example, the digital imaging devices may be organized based on the sizes of the fields of view (e.g., from widest to narrowest), the operational ranges (e.g., from longest to shortest), and/or a combination of these or other characteristics of the devices. An exemplary process for organizing a plurality of digital imaging devices will be described in more detail in FIG. 6 below.

At step 150, a set of digital imaging devices is selected from the plurality of digital imaging devices based on at least one characteristic of each selected device. The view frusta of the selected devices, in combination, substantially cover the entire target volume with at least the target resolution. Exemplary processes for selecting the set of digital imaging devices will be described in more detail below with reference to FIGS. 7 to 9.

At step 160, the selected digital imaging devices are positioned based on their respective physical characteristics and desired performance. For example, the digital imaging devices cannot be positioned such that they physically interfere with each other. In an exemplary implementation, positioning is performed each time a digital imaging device has been selected. In another exemplary implementation, positioning may be performed after more than one device has been selected. In any event, the positioning of the devices may be further adjusted after the entire set of devices has been selected and placed.

Figure 10:
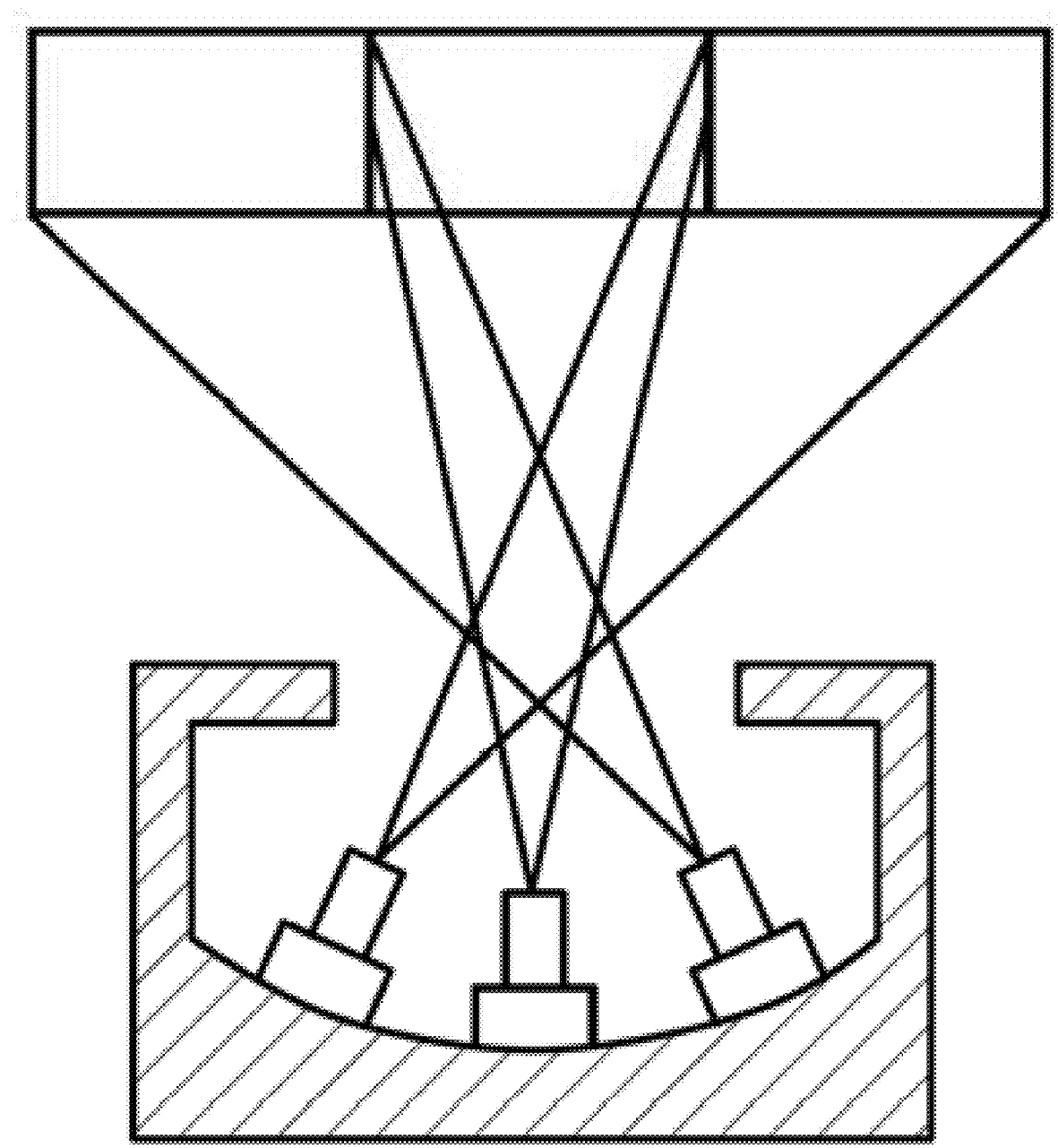
FIG. 10 illustrates an exemplary composite camera having multiple digital imaging devices.
Figure 11:
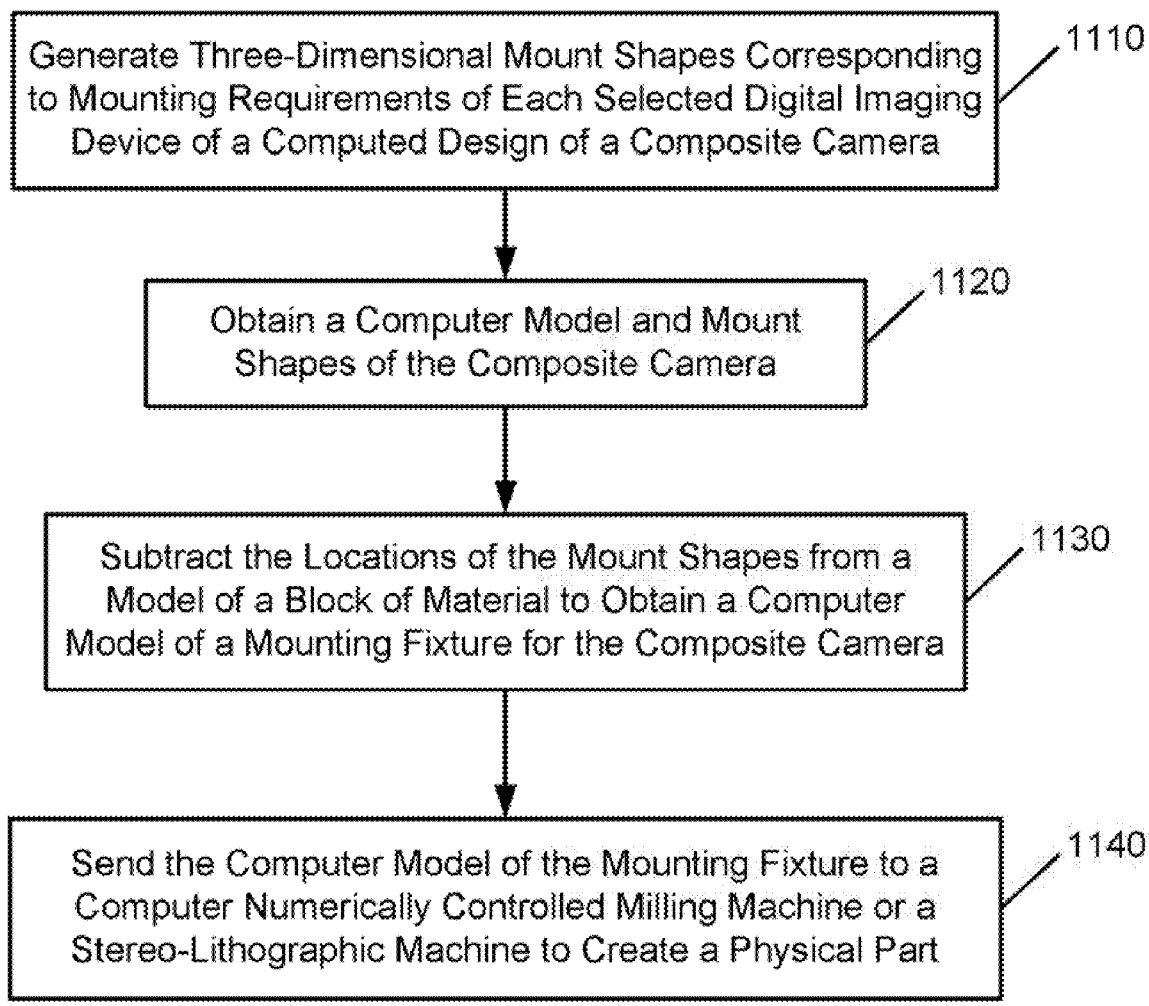
FIG. 11 illustrates an exemplary process for generating a mechanical fixture for retaining the digital imaging devices based on the computed design.

At step 170, a computed design of a composite camera comprising the positioned digital imaging devices is generated. FIG. 10 illustrates an exemplary composite camera comprising three positioned digital imaging devices having view frusta minimally overlapping each other. The computed design may be modified to generate a design of a mechanical fixture for physically mounting the positioned digital imaging devices. FIG. 11 illustrates an exemplary process for modifying the computed design of the composite camera to generate the design of a mechanical fixture for mounting the positioned digital imaging devices to form the camera.

III. An Exemplary Process for Organizing a Plurality of Digital Imaging Devices

Figure 6:
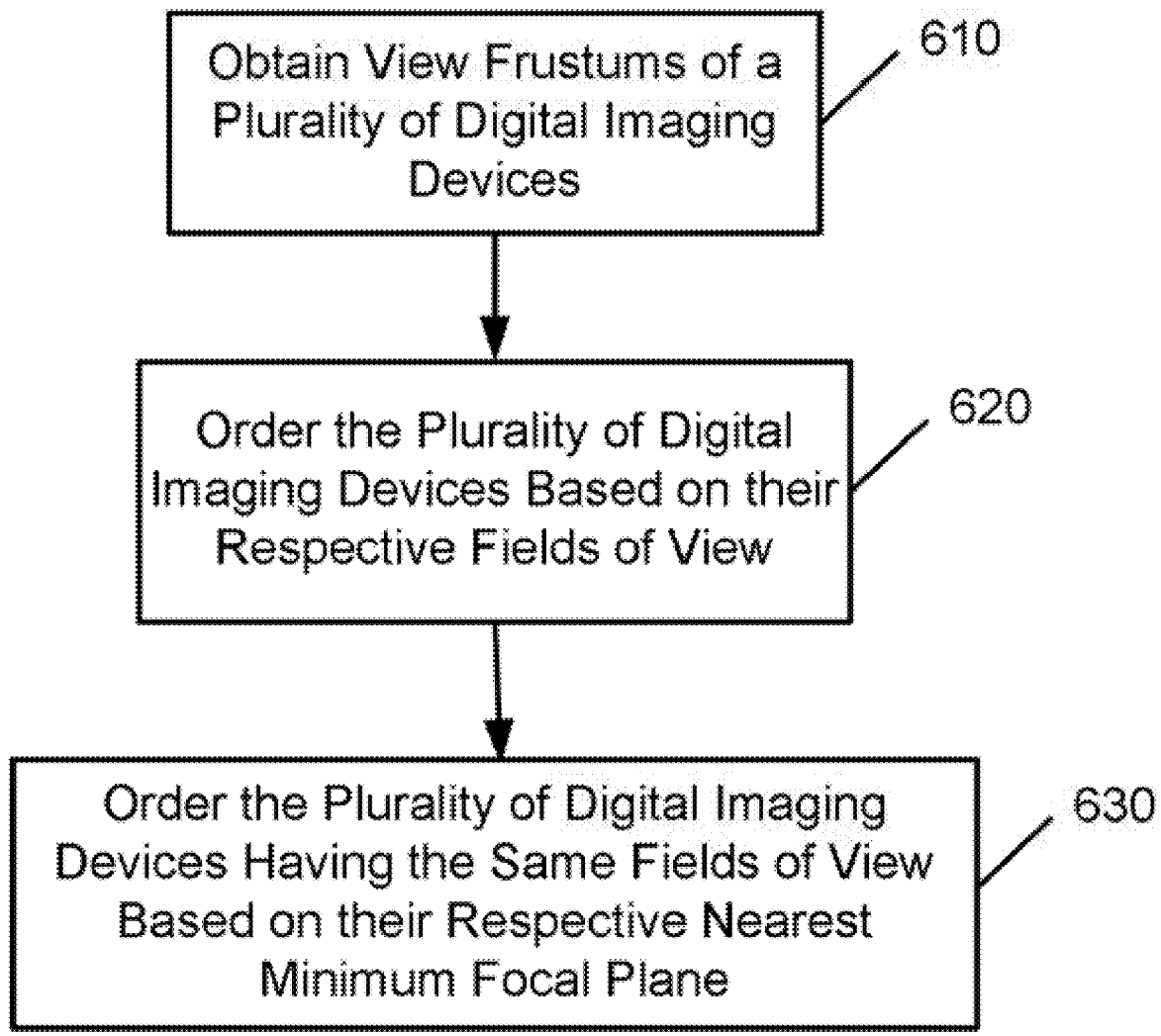
FIG. 6 illustrates an exemplary process for organizing a plurality of digital imaging devices.

FIG. 6 illustrates an exemplary process for organizing a plurality of digital imaging devices.

At step 610, the view frusta of a plurality of digital imaging devices are obtained. In exemplary implementation, the view frusta have been previously generated, for example, as described above at step 130.

At step 620, the plurality of digital imaging devices is first ordered based on the respective field of view of each camera. For example, a device having a wider field of view is placed higher on the list than a device having a narrower field of view.

At step 630, for devices having the same field of view, the devices are next ordered based on the location of their respective nearest minimum focal plane (i.e., Nmin) relative to the device itself. For example, the device that has a nearest minimum focal plane closest to the device is higher on the list than the device that has a nearest minimum focal plane farther from the device.

The exemplary organization process is merely illustrative. A person skilled in the art will recognize that one or more characteristics of the digital imaging devices may be used to organize the devices. This exemplary ordering of the imaging devices, however, can be implemented to simplify the selection process described herein.

Figure 7:
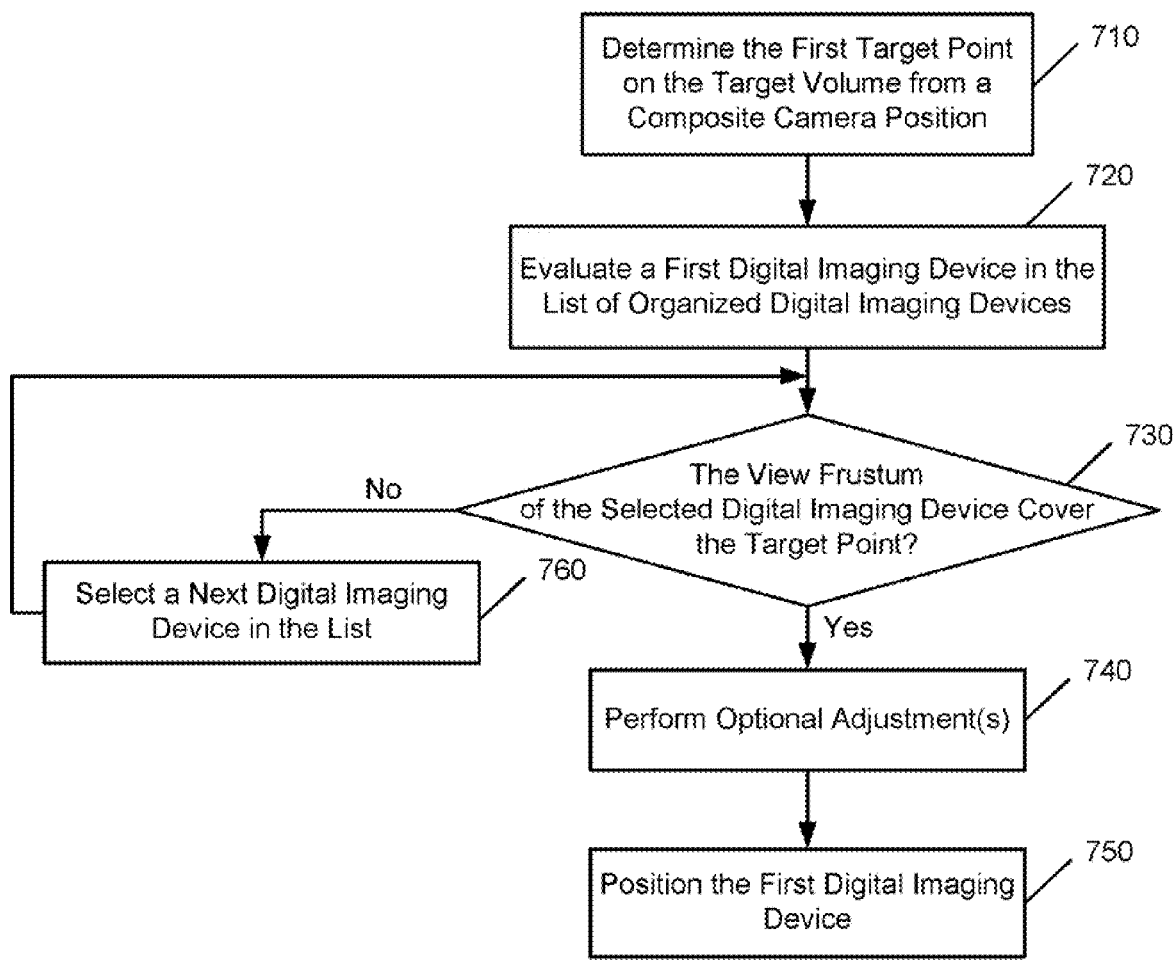
FIG. 7 illustrates an exemplary process for selecting a first digital imaging device.
Figure 8:
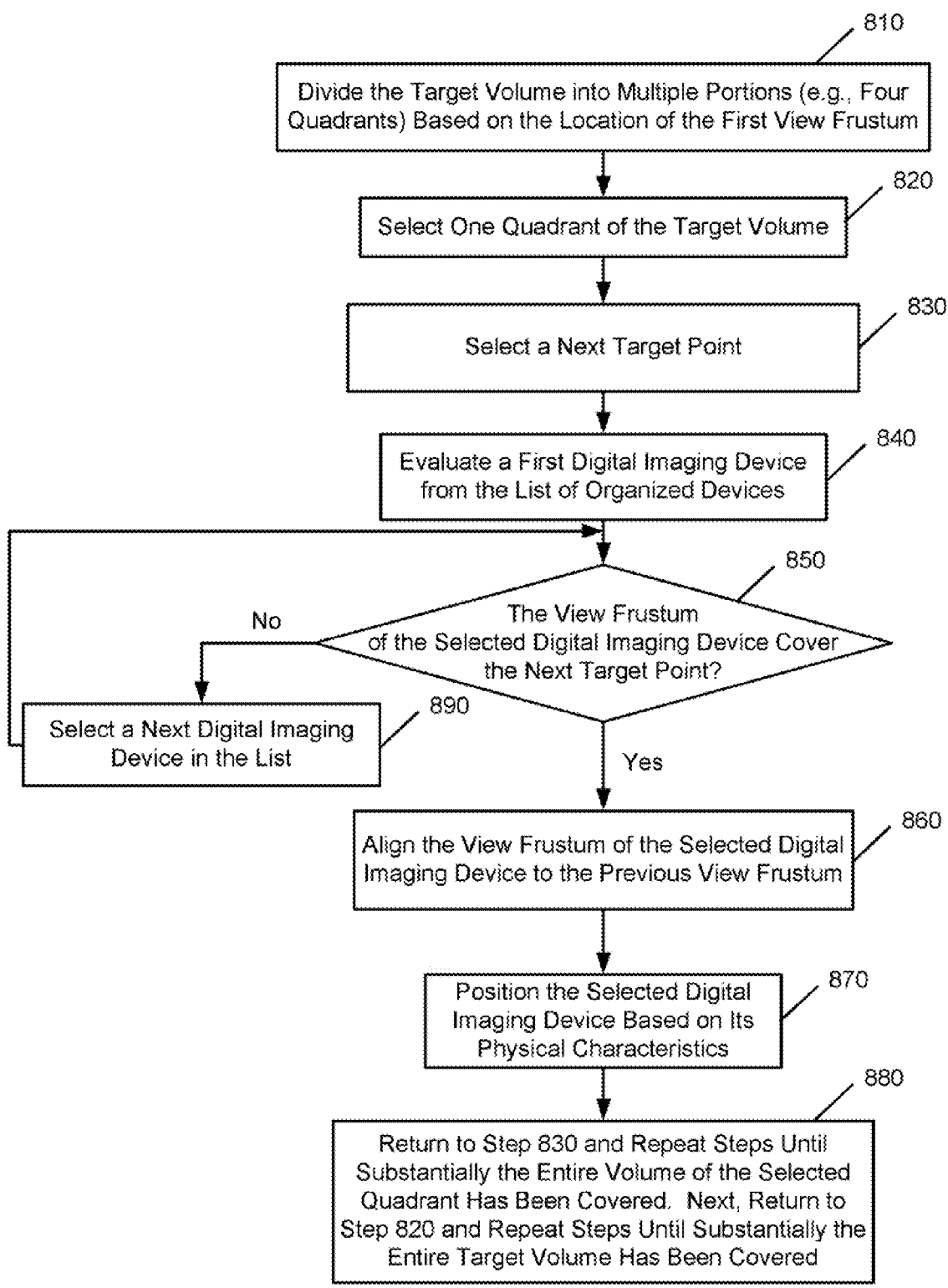
FIG. 8 illustrates an exemplary process for selecting a next digital imaging device.

IV. An Exemplary Process for Selecting Digital Imaging Devices to Cover a Target Volume A target volume is a volume to be captured by a composite camera (to be built) with at least the target resolution. Thus, one exemplary implementation for capturing the target volume (with at least the target resolution) is to position the view frusta of various digital imaging devices so that the view frusta minimally overlap each other, yet in combination substantially cover the entire target volume. The target resolution is met so long as the target volume falls within the selected (and positioned) digital imaging devices's operational ranges. FIGS. 7-8 illustrate exemplary processes for selecting the digital imaging devices among available devices to substantially cover the target volume with at least the target resolution.

A. Selecting a First Digital Imaging Device

FIG. 7 illustrates an exemplary process for selecting a first digital imaging device to cover the target volume.

At step 710, the closest point from the location of the composite camera to the target volume is determined. The camera location may be a predetermined location, a default location, or a variable location entered by a camera designer. The closest point will be referred to as the fist target point.

At step 720, the first digital imaging device on an organized list of devices (e.g., a list of devices organized by the exemplary process of FIG. 6) is selected for evaluation.

Figure 13A:
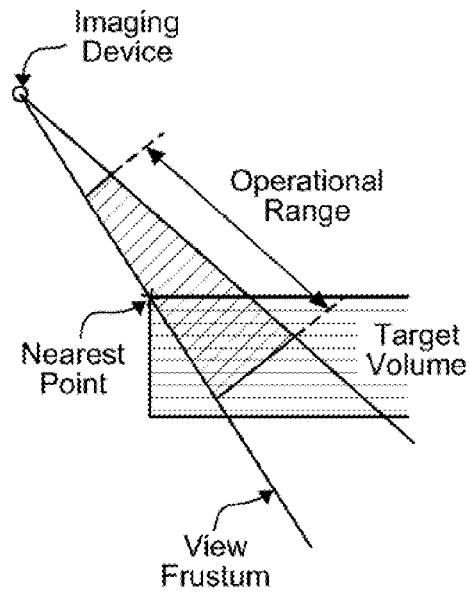
FIGS. 13A-13C illustrate exemplary two-dimensional coverage views of three exemplary digital imaging devices.
Figure 13B:
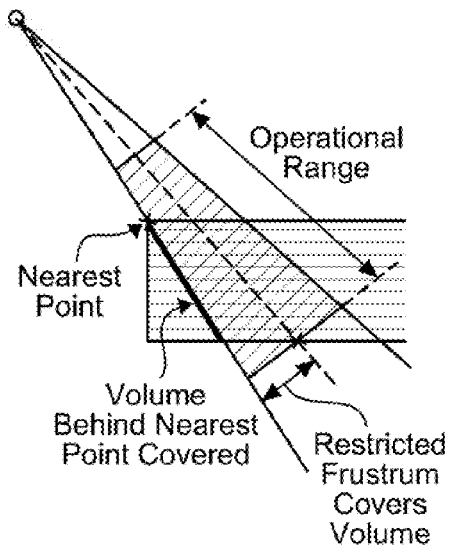
Figure 13C:
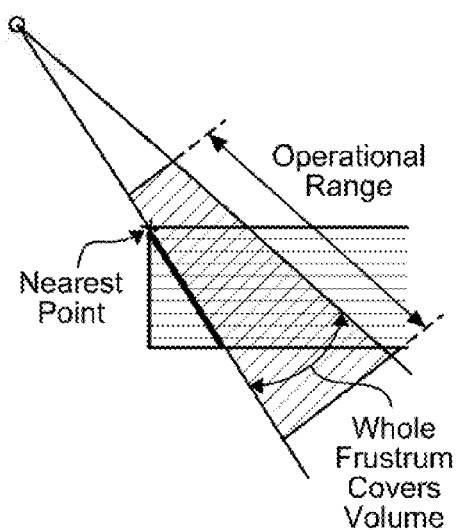

At step 730, whether the operational range of the first digital imaging device covers the first target point and the portion of the target volume behind it is determined. If yes, the extent of the coverage is noted and the process continues at step 740. If no, the process continues at step 760. A two-dimensional view of an exemplary coverage of the target point and the extent of the target volume coverage of each of three exemplary devices are illustrated FIGS. 13A, 13B and 13C. In FIG. 13A, the operational range of a first device does not cover a substantial portion of the volume behind the target point. Thus, the first device is rejected. In FIG. 13B, the operational range of a second device substantially covers the volume behind the target point. Thus, the second device is acceptable. In FIG. 13C, the operational range of the third device covers all of the volume behind the target point. Thus, the third device is accepted and is likely to be selected over the second device. At step 740, optional adjustments may be performed to minimize the number of devices needed to substantially cover the target volume, to improve the selection process, and/or to meet other objectives. In an exemplary implementation, if the devices are to be arranged in landscape mode, one may adjust the view frustum of the first digital imaging device so that its roll angle coincides with the horizontal boundaries of an object within the target volume. In another exemplary implementation, the origin of the view frustum may be adjusted to coincide with an edge of an object within the target volume while still covering the first target point. Other adjustments may or may not be performed in combination (or as an alternative) depending on design choice.

At step 750, the first digital imaging device is positioned on the computed design for the composite camera.

Referring back to step 730, if the operational range of the first digital imaging device on the list of devices does not cover the first target point as described above, then at step 760, a next digital imaging device on the list is selected for evaluation and the process continues at step 730.

The process described above is merely illustrative. A person skilled in the art will recognize that other techniques may be implemented to select a first digital imaging device among a list of available devices.

B. Selecting a Next Digital Imaging Device

FIG. 8 illustrates an exemplary process for selecting the next digital imaging device(s) to cover the rest of the target volume (after a first digital imaging device has been selected and positioned).

At step 810, the target volume is divided into multiple portions (e.g., four quadrants) based on the location of the first view frustum (of the first selected digital imaging device). For example, the bottom left corner of the first view frustum may be set as the origin of a pair of x, y axes and thereby dividing the volume into four quadrants. One skilled in the art will recognize that the division of the target volume is arbitrary and may be entirely dependent on design choice. For instance, one may decide not to divide the target volume at all. For ease of explanation purposes only, the following steps will be described in accordance with a target volume that has been divided into four quadrants.

At step 820, one quadrant is selected. In an exemplary implementation, the first quadrant to be selected is the upper right quadrant (or the quadrant within the +x, +y axes). The second quadrant to be selected is the upper left quadrant (or the quadrant within the −x, +y axes). The third quadrant to be selected is the lower left quadrant (or the quadrant within the −x, −y axes). The last quadrant to be selected is the lower right quadrant (or the quadrant within the +x, −y axes). One skilled in the art will recognize that the order of quadrant is not important and may be selected in any order desired depending on design choice.

At step 830, a next target point is selected. In an exemplary implementation, the bottom, right corner of the first view frustum is selected as the next target point. One skilled in the art will recognize that the selection of the next target point is arbitrary and may be entirely dependent on design choice.

At step 840, a first digital imaging device from the organized list of digital imaging devices is selected for evaluation.

At step 850, whether the operational range of the selected digital imaging device covers the next target point. If yes, the process continues at step 860. If no, the process continues at step 890.

At step 860, the view frustum of the selected digital imaging device is aligned next to the previous view frustum. In exemplary implementation, adjacent view frusta minimally overlap each other.

At step 870, the selected digital imaging device is positioned based on its physical characteristics. For example, the lens of one device should not touch that of another device, the lens of one device should not swing into the field of view of another device, the distance between any two devices or their relative placement may need to be adjusted to accommodate physical constraints, etc. In an exemplary implementation, adjustments can be made by rotating the view frustum about the next target point to maintain coverage of the next target point.

At step 880, the process returns to step 830 and the steps are repeated until substantially the entire volume of the selected quadrant has been covered. After that the process returns to step 820 and the steps are repeated until substantially the entire target volume has been covered.

Figure 9:
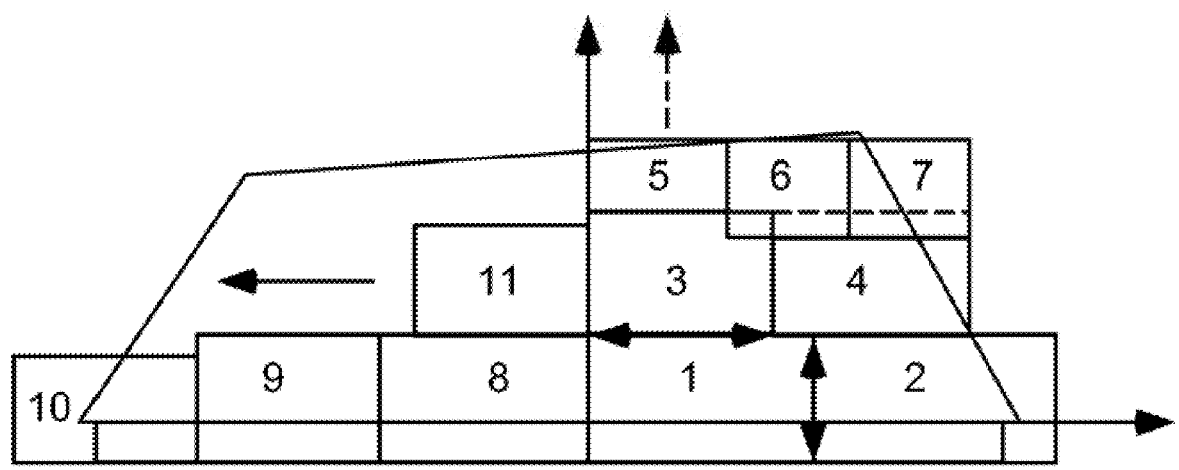
FIG. 9 illustrates an exemplary representation of multiple view frusta of multiple digital imaging devices that substantially cover a target volume.

FIG. 9 illustrates an exemplary arrangement of multiple view frusta of a set of selected digital imaging devices to substantially cover the target volume. In this implementation, the volumes of the quadrants were covered using the exemplary processes described in FIGS. 7 and 8.

Referring back to step 850, if the operational range of the selected digital imaging device does not cover the next target point, then at step 890, the next digital imaging device on the list is selected to be evaluated and the process continues at step 850.

From time to time, more than one device may cover a target point and the portion of the target volume behind it. In such a case, a designer may wish to determine the optimized device by evaluating more than one device on the list (even after a suitable one has already been determined). In this implementation, each suitable device is a candidate device and candidate devices are compared to select an optimized device for coverage of any given target point. For example, a designer may set up parameters to select the device that covers the largest portion of the target volume among candidate devices. This selection can be simplified by implementing an organization process, such as the exemplary process described in Section III above, to organize available digital imaging devices. For example, if the digital imaging devices are organized in accordance with the exemplary process of Section III, imaging devices with a wider field of view are evaluated first. As a result, if the operational range of a device being evaluated completely covers the intersection of the view frustum and the target volume, as illustrated in FIG. 13C, then one does not need to evaluate the other devices further down the list for coverage of the same volume.

In addition, depending on design choice and a particular implementation, a designer may wish to design a composite camera capable of capturing a target volume with variable resolution. For example, certain portions of the target volume may require higher resolution than the rest of the target volume (e.g., portions where a face and/or a document is likely to be present). Such portions may be referred to as "hot spots" within the target volume. In an exemplary implementation, multiple iterations of the processes described above with references to FIGS. 7 and 8 may be implemented to first determine the suitable digital imaging devices for the hot spots at a higher resolution, then determine the suitable digital imaging devices for the rest of the target volume including the hot spots but at a lower resolution.

The process described above is merely illustrative. A person skilled in the art will recognize that other techniques may be implemented to select digital imaging devices among a list of available devices.

V. An Exemplary Process for Optimizing Selection and Placement of Digital Imaging Devices The exemplary processes described thus far may be considered a sequential solution, where individual digital imaging devices are added one at a time, each building upon the placement and constraints that precedes it. In an exemplary implementation, a globally optimal solution may be used as an alternative or in combination with the sequential solution described. A globally optimal solution is one that considers all of the placement issues simultaneously. In one implementation, a globally optimal solution may be obtained by describing the relationships among the various considerations through a cost function indicating the "cost" or "penalty" of any set of parameters. This function together with other device configuration parameters may then be submitted to a "bundle adjustment" optimization, such as the Levenberg-Marquardt method supported in many numerical analysis packages (e.g., MatLab). The optimization may adjust the parameters and/or search for a set of parameters that minimizes cost. Exemplary parameters that may be considered in the cost function include the number of digital imaging devices used, the size of the resulting composite camera, the quantity of wasted pixels (either out of the desired composite camera frustum, or overlapping), the resolution compromises (where resolution is either greater or less than desired), the variation in focal lengths of the lenses employed, and others.

In general, a global bundle adjustment process is preceded by a sequential solution, because global solutions usually require fairly accurate initial estimates of the relevant parameters to properly operate.

VI. An Exemplary Process for Generating a Mechanical Mounting Fixture Based on the Computed Design of the Composite Camera FIG. 11 illustrates an exemplary process for generating a mechanical mounting fixture based on the computed design of a composite camera.

Figure 14:
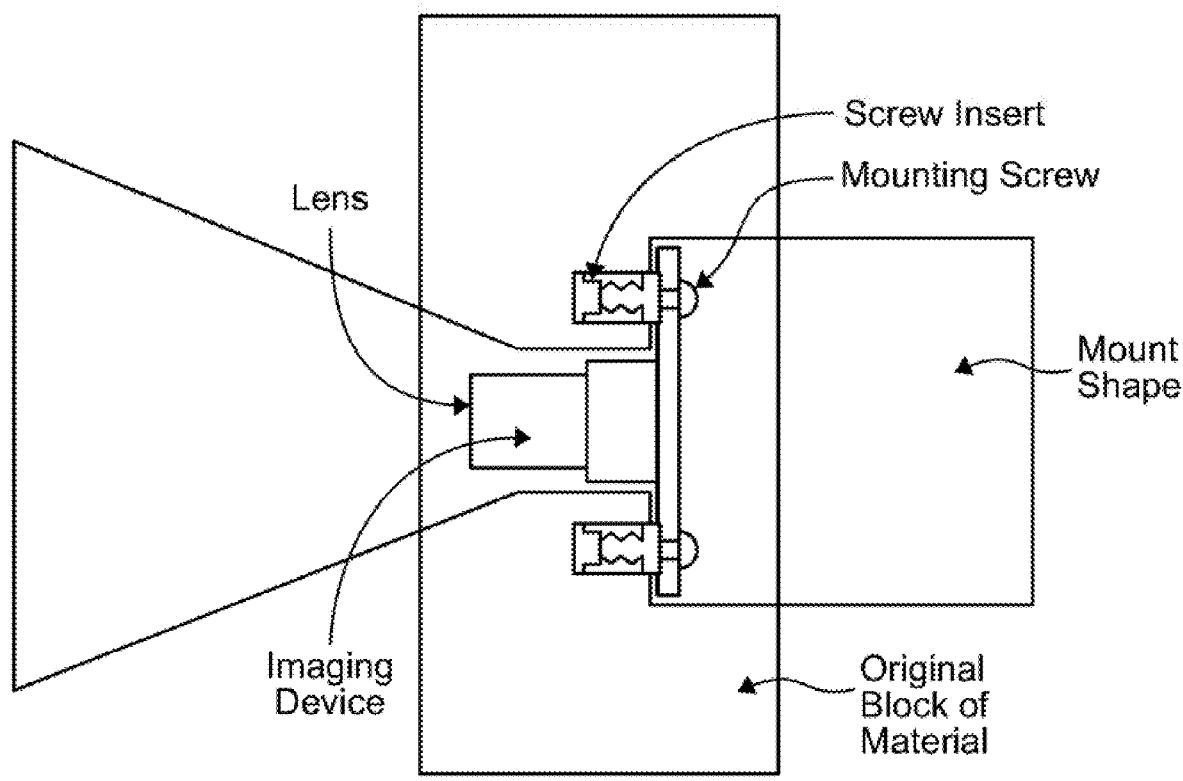
FIG. 14 illustrates an exemplary mount shape in a block of material for providing a surface for a digital imaging device an opening for the lens, and positions for screw inserts.

At step 1110, three-dimensional mount shapes corresponding to mounting requirements of each selected digital imaging device of a computed design of a composite camera is generated. In an exemplary implementation, each mount shape, when subtracted from a block of material, provides the mounting surfaces and fastener locations for each corresponding imaging device. FIG. 14 illustrates an exemplary mount shape in a block of material for providing a surface for an imaging device to rest on, an opening for the lens, and positions for screw inserts.

At step 1120, a computer model of the composite camera and the mount shapes for the set of digital imaging devices (from step 1110) of the composite camera are obtained.

At step 1130, the locations of the selected set of mount shapes are subtracted from a suitably shaped block of material to obtain a computer model of the mounting fixture for the composite camera.

At step 1140, the computer model is sent to a computer numerically controlled (CNC) milling machine or a stereolithography machine to create a physical part (e.g., metal, combination of metal and plastic, etc., depending on desired thermal stability).

The physical part can be subsequently used directly to form the composite camera or to make molds for production of the composite camera in higher quantities. As a result, the composite camera can be reproduced in quantity with minimal manual adjustments.

VII. An Exemplary Computing Environment

The techniques described herein can be implemented using any suitable computing environment. The computing environment could take the form of software-based logic instructions stored in one or more computer-readable memories and executed using a computer processor. Alternatively, some or all of the techniques could be implemented in hardware, perhaps even eliminating the need for a separate processor, if the hardware modules contain the requisite processor functionality. The hardware modules could comprise PLAs, PALs, ASICs, and still other devices for implementing logic instructions known to those skilled in the art or hereafter developed.

In general, then, the computing environment with which the techniques can be implemented should be understood to include any circuitry, program, code, routine, object, component, data structure, and so forth, that implements the specified functionality, whether in hardware, software, or a combination thereof. The software and/or hardware would typically reside on or constitute some type of computer-readable media which can store data and logic instructions that are accessible by the computer or the processing logic. Such media might include, without limitation, hard disks, floppy disks, magnetic cassettes, flash memory cards, digital video disks, removable cartridges, random access memories (RAMs), read only memories (ROMs), and/or still other electronic, magnetic and/or optical media known to those skilled in the art or hereafter developed.

Figure 12:
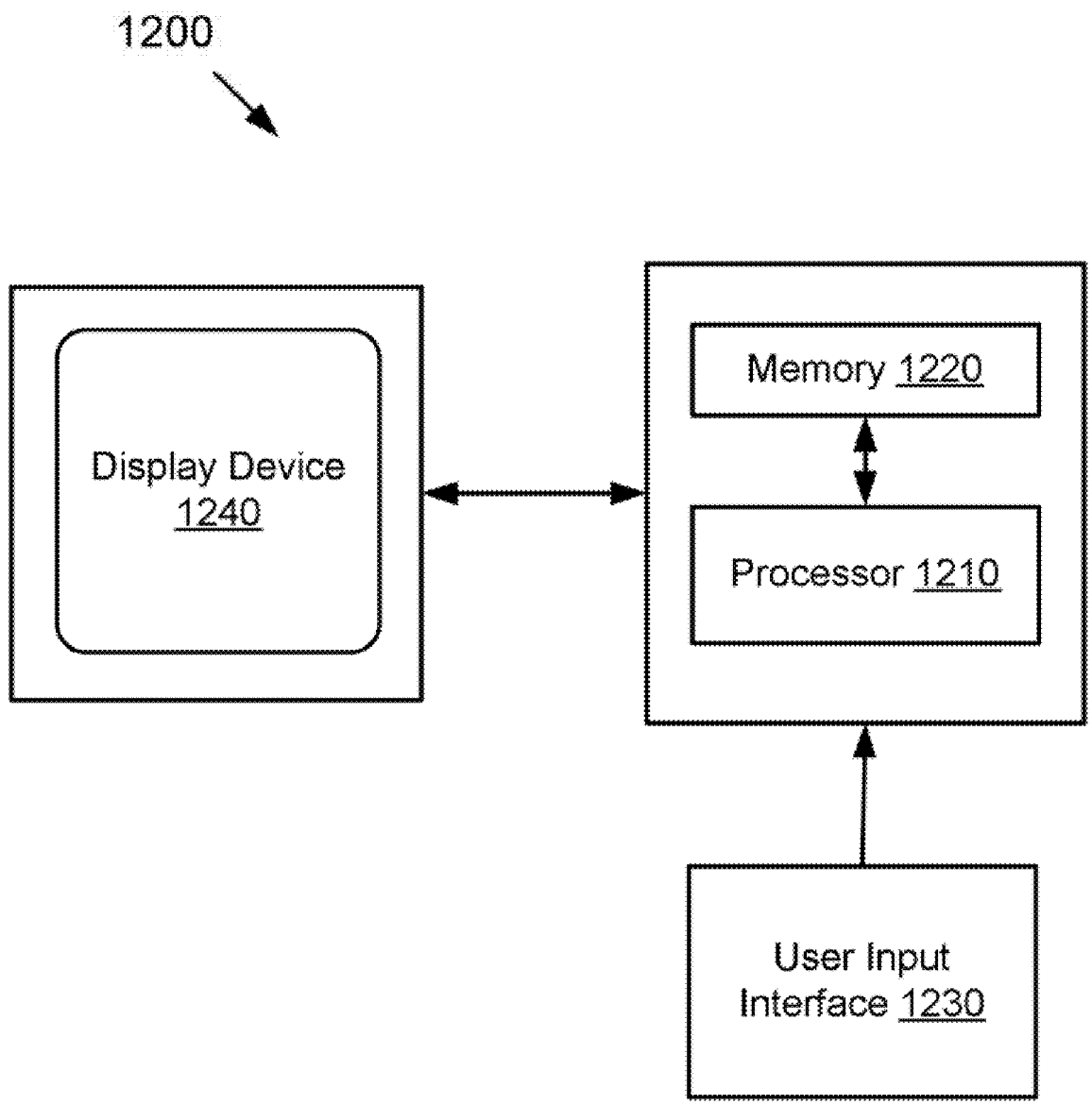
FIG. 12 illustrates an exemplary computing environment.

FIG. 12 illustrates an exemplary computing environment 1200 for implementing the exemplary processes described herein. The exemplary computing environment includes a processor 1210 coupled to a memory 1220 for processing inputs from a user via a user input interface 1230 (e.g., a mouse, a keyboard, a stylus, etc.). The computed design results can be displayed on the display device 1240 which is coupled to the processor 1210.

VIII. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims. Furthermore, some of the claims may include alphanumeric identifiers to distinguish the elements and/or recite elements in a particular sequence. Such identifiers or sequence are merely provided for convenience in reading, and should not necessarily be construed as requiring or implying a particular order of steps, or a particular sequential relationship among the claim elements.

What is claimed is:

1. A computer-implemented method for automatically generating a computed design of a composite camera comprising a plurality digital imaging devices, comprising:

obtaining a target volume to be captured by the composite camera;

obtaining a target resolution for capturing said target volume;

generating a representation of a view frustum of each of a plurality of digital imaging devices based on at least one characteristic of each of the digital imaging devices, wherein each of the digital imaging devices comprises at least one image capture element and a lens;

organizing said plurality of digital imaging devices based on said view frusta of the digital imaging devices;

selecting a set of digital imaging devices from said organized digital imaging devices based on at least one characteristic of each of the digital imaging devices in the selected set, the view frusta of said digital imaging devices in the selected set substantially covering said target volume with at least the target resolution;

determining positions of said digital imaging devices in the selected set based on physical characteristics of the digital imaging devices in the selected set; and generating a computed design of said composite camera comprising said digital imaging devices in the selected set positioned in the determined positions;

wherein the obtaining of the target volume, the obtaining of the target resolution, the generating of the representation of the view frustum of each of the plurality of digital imaging devices, the organizing, the selecting, the determining, and the generating of the computed design are performed by a computer.

2. The method of claim 1, wherein said organizing includes ordering said plurality of digital imaging devices based on device's field of view.

3. The method of claim 1, wherein said obtaining a target volume includes:

obtaining a camera position; and determining said target volume based at least on said camera position.

4. The method of claim 1, wherein said obtaining a target volume includes:

generating a computer model of a volume to be captured by the composite camera.

5. The method of claim 1, wherein said selecting includes:

selecting a first digital imaging device whose view frustum covering a first portion of said target volume; and selecting a second digital imaging device whose view frustum covering a second portion of said target volume adjacent to said first portion of said target volume.

6. The method of claim 1, prior to generating the computed design, further comprising performing an optimization process.

7. The method of claim 6, wherein said optimization process includes:

performing a numerical analysis computation based on variables related to said selected digital imaging devices; and adjusting the combination of said selected digital imaging devices based on said analysis.

8. The method of claim 1, further comprising modifying said computed design to obtain a design of a mechanical fixture for mounting said positioned digital imaging devices to form said composite camera.

9. The method of claim 8, further comprising generating a mechanical mounting fixture based on said modified computed design.

10. The method of claim 9, wherein said mechanical mounting fixture is generated using a stereo-lithographic process.

11. A computer-readable medium containing computer-executable instructions for automatically generating a computed design of a composite camera comprising a plurality of digital imaging devices, said instructions that when executed by a processor cause the processor to perform operations comprising:

obtaining a target volume to be captured by the composite camera;

obtaining a target resolution for capturing said target volume;

generating a representation of a view frustum of each of a plurality of digital imaging devices based on at least one characteristic of each of the digital imaging devices, wherein each of the digital imaging devices comprises at least one image capture element and a lens;

organizing said plurality of digital imaging devices based on said view frusta of the digital imaging devices;

selecting a set of digital imaging devices from said organized digital imaging devices based on at least one characteristic of each of the digital imaging devices in the selected set, the view frusta of said digital imaging devices substantially covering said target volume with at least the target resolution;

determining positions of said digital imaging devices in the selected set based on physical characteristics of the digital imaging devices in the selected set; and generating a computed design of said composite camera comprising said digital imaging devices in the selected set positioned in the determined positions.

12. The computer-readable medium of claim 11, wherein said instructions to obtain a target volume include instructions that when executed by the processor cause the processor to perform operations comprising:

generating a computer model of a volume to be captured by the composite camera.

13. The computer-readable medium of claim 11, wherein prior to said instructions to generate a computed design, further comprising instructions that when executed by the processor cause the processor to perform operations comprising:

performing an optimization process.

14. The computer-readable medium of claim 11, further comprising instructions that when executed by the processor cause the processor to perform operations comprising:

modifying said computed design to obtain a design of a mechanical fixture for mounting said positioned digital imaging devices to form said composite camera.

15. The computer-readable medium of claim 14, further comprising instructions that when executed by the processor cause the processor to perform operations comprising:

generating a mechanical fixture based on said modified computed design.

16. A method for forming a mechanical fixture for mounting a set of digital imaging devices to form a composite camera, comprising:

generating three-dimensional mount shapes corresponding to mounting requirements of a set of digital imaging devices of a computed design of the composite camera, said computed design being generated by a process comprising obtaining a target volume to be captured by said composite cameras, obtaining a target resolution for capturing said target volume, generating a representation of a view frustum of each of a plurality of digital imaging devices based on at least one characteristic of each of the digital imaging devices, wherein each of the digital imaging devices comprises at least one image capture element and a lens, organizing said plurality of digital imaging devices based on said view frusta of the digital imaging devices, selecting said set of digital imaging devices from said organized digital imaging devices based on at least one characteristic of each of the digital imaging devices in the selected set, the view frusta of said digital imaging devices in the selected set substantially covering said target volume with at least the target resolution, determining positions of said digital imaging devices in the selected set based on physical characteristics of the digital imaging devices in the selected set, and generating said computed design of said composite camera comprising said digital imaging devices in the selected set positioned in the determined positions;

obtaining a computer model of said composite camera;

subtracting locations of said mount shapes from a model of a block of material to obtain a computer model of a mounting fixture for said composite camera; and sending said computer model of said mounting fixture to form a physical part.

17. The method of claim 16, further comprising sending said computer model of said mounting fixture to a computer numerically controlled milling machine to form said physical part.

18. The method of claim 16, further comprising sending said computer model of said mounting fixture to a stereolithographic machine to form said physical part.

19. The method of claim 16, wherein prior to generating a computed design, further comprising means for performing an optimization process.

20. The method of claim 16, further comprising mounting said set of digital imaging devices on said physical part to form said composite camera.

* * * * *

UNITED STATES PATENT AND TRADEMARK OFFICE
CERTIFICATE OF CORRECTION

| | |
|---|---|
| PATENT NO. | : 7,680,633 B2 |
| APPLICATION NO. | : 11/410618 |
| DATED | : March 16, 2010 |
| INVENTOR(S) | : Henry Harlyn Baker et al. |

Page 1 of 1

It is certified that error appears in the above-identified patent and that said Letters Patent is hereby corrected as shown below:

In column 11, line 40, in Claim 16, delete "cameras," and insert -- camera, --, therefor.

Signed and Sealed this

Fifth Day of October, 2010

David J. Kappos
*Director of the United States Patent and Trademark Office*